United States Patent
Chang

(10) Patent No.: US 7,386,073 B2
(45) Date of Patent: Jun. 10, 2008

(54) AUTOMATIC FREQUENCY CONTROL DEVICE AND METHOD OF QPSK MODULATION SYSTEM

(75) Inventor: Seok-Il Chang, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 10/918,600

(22) Filed: Aug. 16, 2004

(65) Prior Publication Data

US 2005/0036574 A1 Feb. 17, 2005

(30) Foreign Application Priority Data

Aug. 14, 2003 (KR) ............... 10-2003-0056523

(51) Int. Cl.
*H04L 27/06* (2006.01)
(52) U.S. Cl. .................................. 375/344
(58) Field of Classification Search ............. 375/279, 375/280, 281, 283, 329, 330, 331, 332, 344, 375/346, 349, 351; 324/199; 348/536, 735; 455/71, 75, 76, 113, 136, 164.1, 164.2, 173.1, 455/182.2, 192.2
See application file for complete search history.

(56) References Cited

U.S. PATENT DOCUMENTS

| | | | |
|---|---|---|---|
| 5,151,926 A | | 9/1992 | Chennakeshu et al. ....... 375/84 |
| 5,809,009 A | * | 9/1998 | Matsuoka et al. .......... 370/206 |
| 5,881,099 A | * | 3/1999 | Takahashi et al. .......... 375/141 |
| 5,960,039 A | | 9/1999 | Martin et al. |
| 6,160,838 A | * | 12/2000 | Shinohara et al. .......... 375/130 |
| 6,571,088 B1 | * | 5/2003 | Hasegawa ................ 455/182.2 |
| 2002/0085652 A1 | * | 7/2002 | Okubo et al. ............... 375/344 |

FOREIGN PATENT DOCUMENTS

| | | |
|---|---|---|
| EP | 1235401 | 8/2002 |
| JP | 07-066842 | 3/1995 |
| JP | 07-273823 | 10/1995 |
| KR | 1070102420000 | 6/1997 |
| KR | 1002557260000 | 2/2000 |
| WO | WO 02/099988 A1 | 12/2002 |

OTHER PUBLICATIONS

European Search Report dated Dec. 22, 2004.
Japanese Office Action dated Jun. 27, 2006.

* cited by examiner

*Primary Examiner*—Sam K. Ahn
(74) *Attorney, Agent, or Firm*—KED & Associates, LLP

(57) ABSTRACT

An AFC (Automatic Frequency Control) device of a QPSK modulation system including a frequency discriminating unit for calculating a real part peak value using frequency discrimination between adjacent I and Q signals of a received sequence and an imaginary part peak value using the frequency discrimination between adjacent I signals and adjacent Q signals, an error detecting unit for detecting an error symbol from the received sequence, and a switching unit for removing the detected error symbol under the control of the error detector. Also included is a frequency difference average calculating unit for calculating a frequency difference of the received sequence without the error symbol.

24 Claims, 4 Drawing Sheets

ND METHOD OF QPSK
AUTOMATIC FREQUENCY CONTROL DEVICE AND METHOD OF QPSK MODULATION SYSTEM

CROSS-REFERENCE TO A RELATED APPLICATION

This application claims priority to Korean application No. 56523/2003 filed Aug. 14, 2003, the entire contents of which are hereby incorporated in its entirety.

BACKGROUND OF THE INVENTION

1. Field of the Invention

The present invention relates to an AFC (Automatic Frequency Control) of a QPSK (Quadrature Phase Shift Keying) modulation system, and more particularly to an AFC device and method of a QPSK modulation system capable of raising an accuracy of the AFC by calculating a frequency difference excluding an error symbol.

2. Background of the Related Art

In general, when a channel is changed in a mobile communication system, a transmission/reception frequency is also changed. Thus, a receiving side needs to be tuned with the corresponding changed frequency used by the sending side.

Further, the receiving side uses an AFC device to detect an allocated channel frequency. In addition, the receiving side also uses the AFC device to prevent degradation of the receive sensitivity due to a multi-path fading phenomenon.

A general AFC device calculates frequency differences between adjacent I and Q signals using a frequency discriminator of a cross product type, calculates an average value of the calculated frequency differences, and then performs AFC using the obtained average value.

In this manner, the general AFC device calculates the frequency difference using a symbol of a received training sequence and performs AFC using the calculated frequency difference. However, the general AFC device calculates a frequency difference of the training sequence including an error symbol, which reduces the accuracy of the frequency difference value and degrades the performance of the AFC device.

SUMMARY OF THE INVENTION

Accordingly, one object of the present invention is to address at least the above and other noted objects.

Another object of the present invention is to remove influences of the error symbol on the frequency difference values and raise the accuracy of AFC.

To achieve at least the above objects in whole or in parts, the present invention provides a novel AFC device of a QPSK modulation system including a frequency discriminating unit for calculating a real part peak value using a frequency discrimination between adjacent I and Q signals in a received sequence and an imaginary part peak value using a frequency discrimination between adjacent I signals and adjacent Q signals in the received sequence, and an error detecting unit for detecting an error symbol from the received sequence. The device also includes a switching unit for removing the detected error symbol under the control of the error detecting unit, and a frequency difference average calculating unit for calculating an average of frequency difference values of the received sequence without the error symbol. The present invention also provides a novel AFC method.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION

In the present invention, an AFC device calculates a real part peak value using frequency discrimination between I and Q signals of adjacent symbols and an imaginary part peak value using frequency discrimination between adjacent I signals and adjacent Q signals using a double product type frequency discriminating unit, calculates a frequency difference of input symbols using the calculated two types of peak values, and performs an AFC using the calculated frequency difference.

In addition, according to the present invention, a received symbol, which does not fall within a decision region, is detected, and then a frequency difference is calculated excluding the detected symbol.

Figure 1:
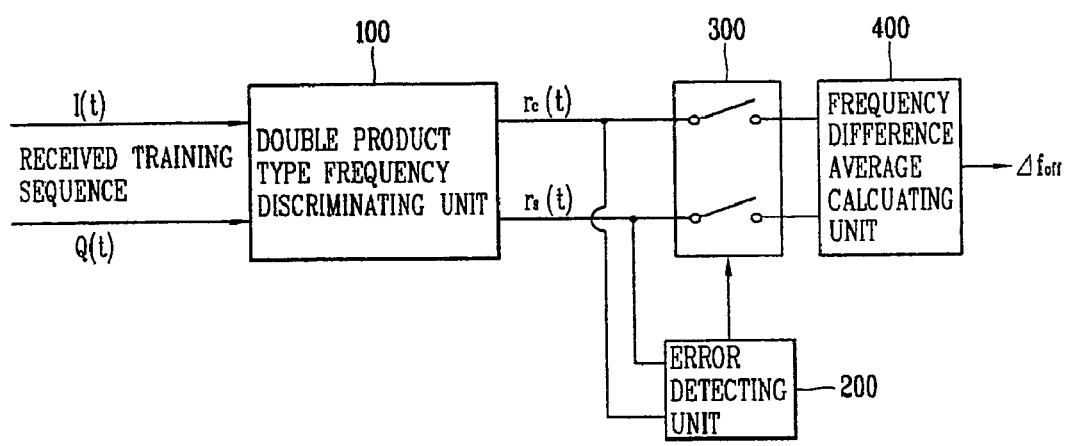
FIG. 1 is a block diagram of an AFC device of a QPSK modulation system according to the present invention.

Turning now to FIG. 1, which is a block diagram of an AFC device of a QPSK modulation system according to the present invention. As shown, an AFC device of a QPSK modulation system includes a double product type frequency discriminating unit 100 for receiving a QPSK type input sequence, sequentially calculating a real part peak value using the product of adjacent I and Q signals, and sequentially calculating an imaginary part peak value by using the product of adjacent I signals and the product of adjacent Q signals; an error detecting unit 200 for detecting an error symbol using the real and imaginary part peak values and outputting a control signal to remove a real part peak value and an imaginary part peak value according to the detected error symbol; a switching unit 300 for selectively bypassing the real and imaginary part peak values outputted from the double product type frequency discriminating unit 100 according to the control signal; and a frequency difference average calculating unit 400 for calculating an average of the real part peak values and an average of the imaginary part peak values outputted from the switching unit 300 and calculating a frequency difference average of the inputted sequence using the calculated averages of the real part peak value and the imaginary part peak value.

Figure 2:
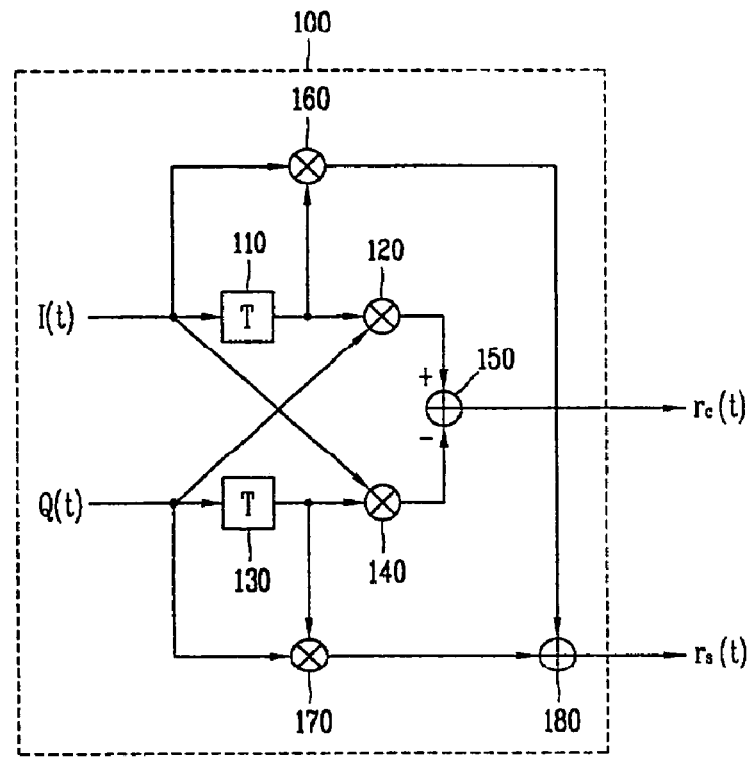
FIG. 2 is an overview of a double product type frequency discriminating unit.

With reference to FIG. 2, the double product type frequency discriminating unit 100 includes first single type frequency discriminators for calculating a real part peak value using the product of adjacent I and Q signals; and second single type frequency discriminators for calculating an imaginary part peak value using the product of adjacent I signals and the product of adjacent Q signals.

The first single type frequency discriminators include a first delay unit 110 for delaying an inputted I signal for a certain amount of time; a first multiplier 120 for multiplying the I signal delayed in the first delay unit 110 and an inputted Q signal; a second delay unit 130 for delaying the inputted Q signal for a certain amount of time; a second multiplier 140 for multiplying the Q signal delayed in the second delay unit 130 and the inputted I signal; and a first adder 150 for calculating a difference value between outputs of the first and second multipliers 120 and 140 and outputting a real part peak value $(r_c(t))$.

The second single type frequency discriminators include a third multiplier 160 for multiplying the inputted I signal and the I signal which has been delayed for a certain amount of time; a fourth multiplier 170 for multiplying the inputted Q signal and the Q signal which has been delayed for a certain amount of time; and a second adder 180 for calculating outputs of the first and second multipliers 160 and 170 and outputting an imaginary part peak value $(r_s(t))$. The certain amount of time indicates a symbol period.

Figure 3:
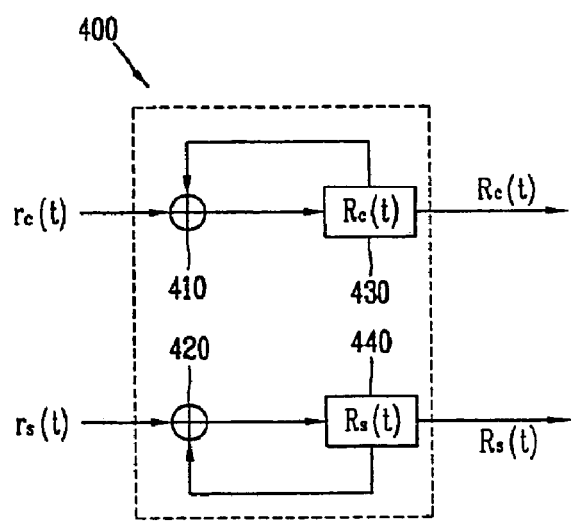
FIG. 3 is an overview of a frequency difference average calculating unit.

With reference to FIG. 3, the frequency difference average calculating unit 400 includes peak average calculating units for calculating a real and imaginary part peak value averages of the inputted sequence using a vector sum method; and a frequency difference output unit (not shown) for calculating a frequency difference average $(\Delta f_{off})$ of the inputted sequence using the calculated real and imaginary part peak value averages.

The peak average calculating units includes first and second adders 410 and 420 for respectively adding the real and imaginary part peak values outputted from the switching unit 300 to the real and imaginary part peak value averages using the vector sum method; and a first average calculator 430 for outputting the real part peak value average using a value outputted from the first adder 410 and providing the real part peak value average to the first adder 410; and a second average calculator 440 for outputting the imaginary part peak value average using a value outputted form the second adder 420 and providing the imaginary part peak value average to the second adder 420.

The operation of the AFC device of the above-noted QPSK modulation system will now be described.

Figure 4:
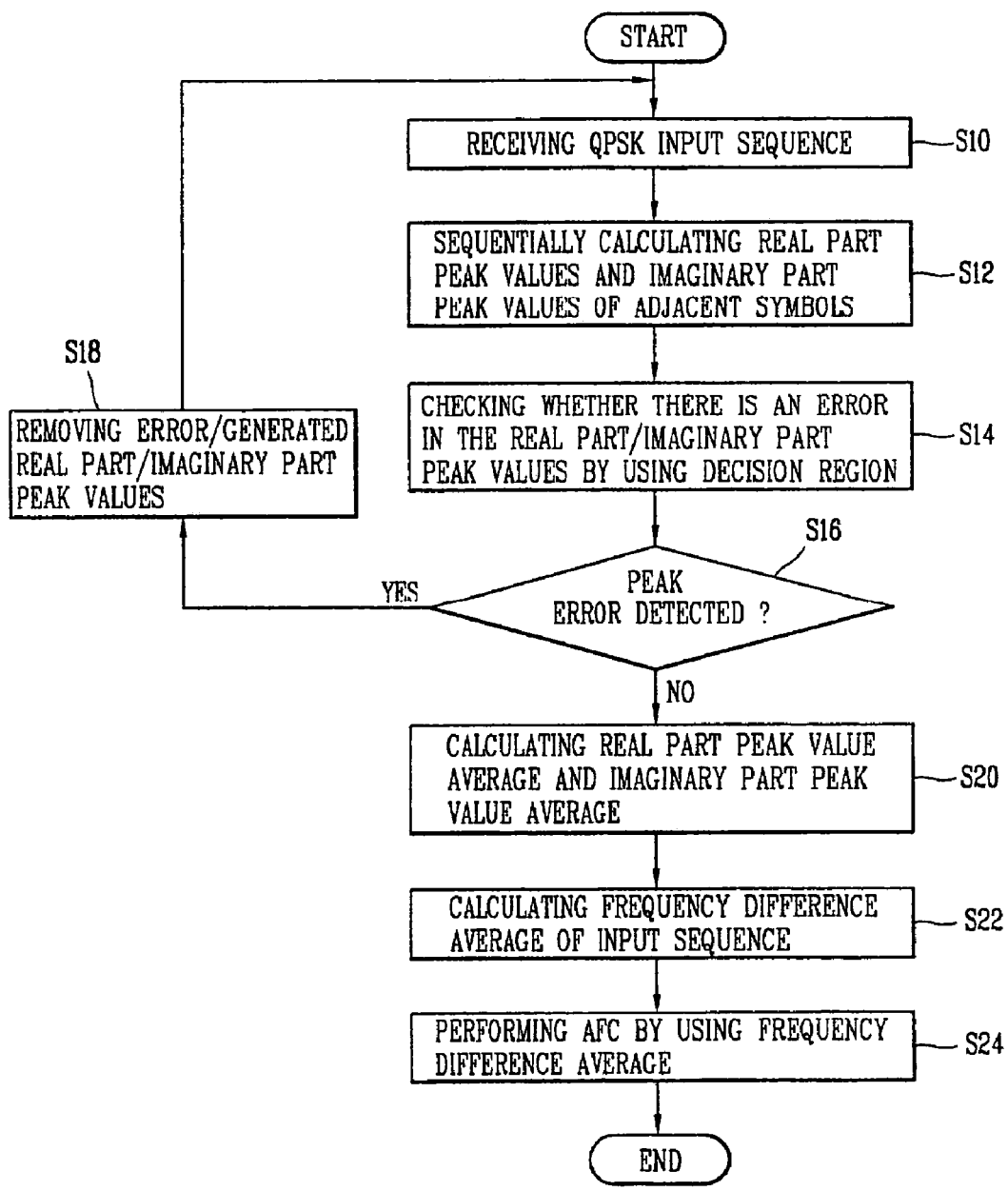
FIG. 4 is a flowchart of an AFC method of a QPSK modulation system according to the present invention.

FIG. 4 is a flowchart of an AFC method of a QPSK modulation system according to the present invention. In performing AFC, the training sequence known by both the sending and receiving side is used. For example, in a TD-SCDMA (Time Division Synchronous Code Division Multiple Access) system, a training sequence of 144 chips is used.

Figure 5:
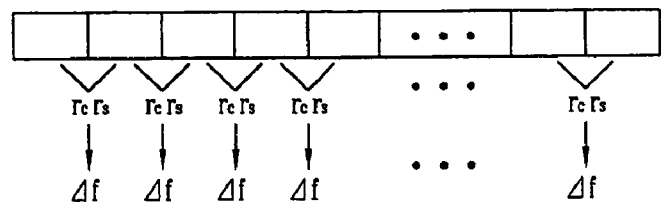
FIG. 5 illustrates real and imaginary part peak values output between adjacent symbols by the double product type frequency discriminating unit.

When the training sequence of 144 chips is inputted in a QPSI complex symbol form, the double product type frequency discriminating unit 100 calculates the real part peak value $(r_c(t))$ and the imaginary part peak value $(r_s(t))$ of adjacent symbols, and such calculation is sequentially performed during the training sequence region (steps S10 and S12). Thus, for example, if an input sequence is 144-chip training sequence, as shown in FIG. 5, the real part peak value $(r_c(t))$ and the imaginary part peak value $(r_s(t))$ outputted from the double product type frequency discriminating unit 100 are 143, respectively.

The calculation of the real part peak value $(r_c(t))$ using the frequency discrimination between adjacent symbols is as follows. When an I signal (I(t)) and a Q signal (Q(t)) of a QPSI complex symbol are inputted, the first multiplier 120 of the double product type frequency discriminating unit 100 multiplies an I signal (I signal of a previous symbol) (I(t+T)) which has been delayed as long as a symbol period (T) through the first delay unit 110 and a currently inputted Q signal. Further, the second multiplier 140 multiplies a Q signal (Q signal of the previous symbol) (Q(t+T)) which has been delayed as long as a symbol period (T) through the second delay unit 130 and a currently inputted I signal (I(t)). The first adder 150 calculates a difference between an output of the first multiplier 120 and an output of the second multiplier 140 and outputs a real part peak value $(r_c(t))$ between the current symbol and the previous symbol.

In addition, the calculation of the imaginary part peak value $(r_s(t))$ using frequency discrimination between adjacent symbols is as follows. The third multiplier 160 of the double product type frequency discriminating unit 100 multiplies a currently inputted I signal (I(t)) and an I signal (I signal of a previous symbol)(I(t+T)) which has been delayed as long as the symbol period (T) by the first delay unit (110). The fourth multiplier 170 multiplies a currently inputted Q signal (Q(t)) and a Q signal (Q signal of the previous symbol)(Q(t+T)) which has been delayed as long as the symbol period m by the second delay unit 130. The second adder 180 adds an output of the third multiplier 160 and an output of the fourth multiplier 170, and outputs an imaginary part peak value $(r_s(t))$ between the current symbol and the previous symbol.

For a QPSK modulation system, if an input frequency difference is $\Delta f$, the input signals I(t) and Q(t) can be expressed by equations (1) and (2) shown below:

$$I(t)=\sin(2\pi\Delta ft+\theta) \quad (1)$$

$$Q(t)=\cos(2\pi\Delta ft+\theta) \quad (2)$$

where $\theta$ indicates a phase of an input signal.

When the input signals I(t) and Q(t) are inputted, the real part peak value $(r_c(t))$ and the imaginary part peak value $(r_s(t))$ outputted by the double product type frequency discriminating unit 100 can be expressed by equations (3) and (4) shown below:

$$r_c(t)=Q(t)\times I(t+T)-I(t)\times Q(t+T)=\sin(2\pi\Delta ft) \quad (3)$$

$$r_s(t)=I(t)\times I(t+T)+Q(t)\times Q(t+T)=\cos(2\pi\Delta ft) \quad (4)$$

where 'T' indicates a symbol period.

Further, a frequency difference can be calculated using an arbitrary real part peak value $(r_c(t))$ and imaginary part peak value $(r_s(t))$ by equation (5) shown below:

$$\Delta f = \frac{1}{2\pi T} \cdot \tan^{-1}\left(\frac{r_c(t)}{r_s(t)}\right) \quad (5)$$

Figure 6:
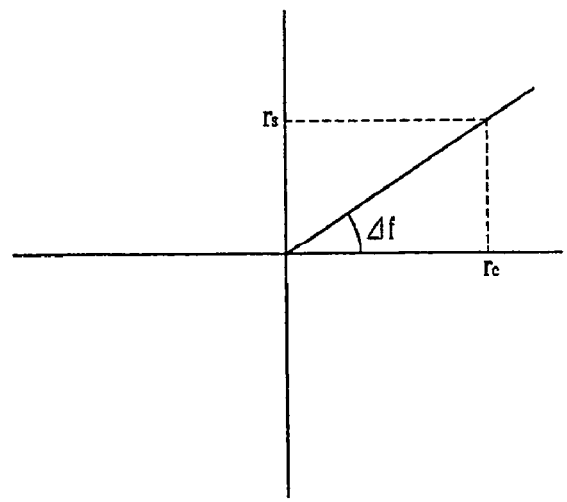
FIG. 6 is a graph showing a relation among the real peak value, the imaginary part peak value and a frequency difference between adjacent symbols.

Next, FIG. 6 is a graph showing a relation among the real peak value, the imaginary part peak value and a frequency difference between adjacent symbols.

With reference to FIGS. 5 and 6, for a 144-chip training sequence, 143 real part peak values $(r_c(t))$ and 143 imaginary part peak values $(r_s(t))$ can be calculated by the double product type frequency discriminating unit 100, and 143 frequency differences (Δf) between symbols are obtained using the 143 real part peak value ($r_c(t)$) and the 143 imaginary part peak values ($r_s(t)$).

Figure 7:
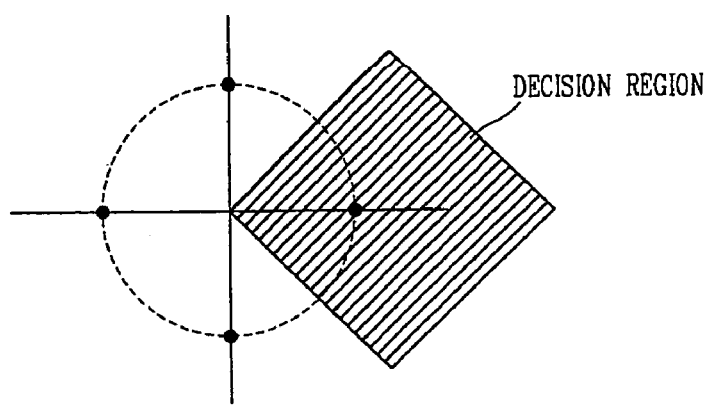
FIG. 7 is a graph illustrating an error symbol decision region.

When 143 real part peak values ($r_c(t)$) and 143 imaginary part peak values ($r_s(t)$) for the 144-chip training sequence are sequentially outputted at every symbol period by the double product type frequency discriminating unit 100, the error detecting unit 200 detects an error symbol based on the decision region of each QPSK symbol as shown in FIG. 7 (step S14). The decision region is for deciding whether a received symbol is normal. Accordingly, a symbol that does not fall within a corresponding region is regarded as an error symbol.

If a real part peak value ($r_c(t)$) and an imaginary part peak value ($r_s(t)$) calculated using a received specific symbol is within a range of equation (6) shown below, the specific symbol is regarded of being out of the decision region.

$$\operatorname{Tan}\left(\frac{r_c(t)}{r_s(t)}\right) > \frac{\pi}{4}, \tan\left(\frac{r_c(t)}{r_s(t)}\right) < -\left(\frac{\pi}{4}\right) \quad (6)$$

Equation (6) can also be expressed by equation (7) shown below:

$$\frac{r_c(t)}{r_s(t)} > 1, \frac{r_c(t)}{r_s(t)} < -1 \quad (7)$$

Accordingly, the error detector 200 can detect an error symbol according to whether or not the real part peak value ($r_c(t)$) and the imaginary part peak value ($r_s(t)$) outputted from the double product type frequency discriminating unit 100 satisfies the condition of equation (7).

If the real part peak value ($r_c(t)$) and the imaginary part peak value ($r_s(t)$) outputted from the double product type frequency discriminating unit 100 satisfies the condition of equation (7) (step S16), the error detecting unit 200 determines that the real part peak value ($r_c(t)$) and the imaginary part peak value ($r_s(t)$) has been calculated using an error symbol and controls the switching unit 300 so that the real part peak value ($r_c(t)$) and the imaginary part peak value ($r_s(t)$) may not be bypassed. The switching unit 300 is xswitched off under the control of the error detecting unit 200 and removes the real part peak value ($r_c(t)$) and the imaginary part peak value ($r_s(t)$) (step S18).

However, if the real part peak value ($r_c(t)$) and the imaginary part peak value ($r_s(t)$) outputted from the double product type frequency discriminating unit 100 does not satisfy the condition of equation (7), the error detector 200 determines that the real part peak value ($r_c(t)$) and the imaginary part peak value ($r_s(t)$) have been calculated by using a normal symbol and controls the switching unit 300 so that the real part peak value ($r_c(t)$) and the imaginary part peak value ($r_s(t)$) can be bypassed.

The switching unit 300 is switched on under the control of the error detecting unit 200 and bypasses the real part peak value ($r_c(t)$) and the imaginary part peak value ($r_s(t)$) to the frequency difference average calculating unit 400.

Then, the frequency difference average calculating unit 400 adds the real part peak values ($r_c(t)$) and the imaginary part peak values ($r_s(t)$) outputted from the switching unit 300 in a vector sum method to calculate a real part peak value average ($R_c(t)$) and an imaginary part peak value average ($R_s(t)$) (step S20).

The frequency difference average calculating unit 400 also calculates a frequency difference average ($\Delta f_{off}$) of the training sequence from the obtained real part peak value average ($R_c(t)$) and the imaginary part peak value average ($R_s(t)$) using the same method as equation (8) shown below (step S22):

$$(\Delta f_{off}) = \tan^{-1}\left(\frac{R_c(t)}{R_s(t)}\right) \quad (8)$$

The AFC device performs AFC using the frequency difference average ($\Delta f_{off}$) of the training sequence outputted from the frequency difference average calculating unit 400 (step S24). In calculating the frequency difference average ($\Delta f_{off}$) of the training sequence in the AFC device, a frequency difference calculated using an error symbol is excluded to minimize an influence by the error symbol in AFC.

As so far described, the AFC device and method of a QPSK modulation system in accordance with the present invention have many advantages.

That is, for example, first, if the real and imaginary part peak values using the frequency discrimination of adjacent symbols do not come within a certain range, a symbol used in calculating the real and imaginary part peak values is determined as an error symbol, thereby simply detect an error symbol of an input sequence.

Second, an error symbol is detected from an inputted sequence and a frequency difference of input symbols excluding the error symbol is calculated, whereby an influence of the error symbol on the frequency difference value is removed and thus the accuracy of the AFC is improved.

Third, a real part peak value between an adjacent I signal and Q signal and an imaginary part peak value is calculated using the product of adjacent I signals and the product of adjacent Q signals, and then a frequency difference is calculated using two types of peak values, thereby obtaining a more accurate frequency difference value.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An AFC (Automatic Frequency Control) device of a QPSK (Quadrature Phase Shift Keying) modulation system comprising:
a frequency discriminating unit for calculating a real part peak value based on a frequency discrimination between adjacent I and Q signals in a received sequence, and for calculating an imaginary part peak value based on a frequency discrimination between adjacent I signals and adjacent Q signals in the received sequence;
an error detecting unit for detecting an error symbol based on the real part peak value and the imaginary part peak value;
a switching unit for removing the detected error symbol under the control of the error detecting unit; and
a frequency difference average calculating unit for calculating an average of real part peak values and an average of imaginary part peak values output from the switching unit, the frequency difference average calculating unit further calculating a frequency difference average of the received sequence based on the averages of the real part and imaginary part peak values, wherein automatic frequency control is performed based on the frequency difference average calculated by the frequency difference average calculating unit.

2. The device of claim 1, wherein the real part peak value is calculated based on a difference value between the product of a Q signal of a current symbol and an I signal of a previous symbol and the product of an I signal of the current symbol and a Q signal of the previous symbol.

3. The device of claim 1, wherein the imaginary part peak value is calculated based on a value obtained by adding the product of an I signal of a current symbol and an I signal of a previous symbol and the product of a Q signal of the current symbol and a Q signal of the previous symbol.

4. The device of claim 1, wherein the real part peak value and the imaginary part peak value are calculated at every symbol period.

5. The device of claim 1, wherein the error detecting unit detects the error symbol based on a frequency difference calculated between adjacent symbols is using the following equation:

$$\frac{1}{2\pi T} \cdot \tan^{-1}\left(\frac{r_c(t)}{r_s(t)}\right)$$

wherein $r_c(t)$ is the real part peak value, $r_s(t)$ is the imaginary part peak value, and 'T' indicates a symbol period.

6. The device of claim 1, wherein the frequency discriminating unit comprises:
a first single type frequency discriminator for calculating the real part peak value using the product of adjacent I and Q signals; and
a second single type frequency discriminator for calculating the imaginary part peak value using the product of adjacent I signals and the product of adjacent Q signals.

7. The device of claim 6, wherein the first single type frequency discriminator comprises:
a first delay unit for delaying an inputted I signal for a certain amount of time;
a first multiplier for multiplying the I signal delayed by the first delay unit and an inputted Q signal;
a second delay unit for delaying the inputted Q signal for the certain amount of time;
a second multiplier for multiplying the Q signal delayed by the second delay unit and the inputted I signal; and
a first adder for calculating a difference value between outputs of the first and second multipliers and outputting the real part peak value.

8. The device of claim 7, wherein the certain time is a symbol period.

9. The device of claim 7, wherein the second single type frequency discriminator comprises:
a third multiplier for multiplying an inputted I signal and an I signal which has been delayed for a certain time;
a fourth multiplier for multiplying an inputted Q signal and an Q signal which has been delayed for the certain time; and
a second adder for calculating outputs of the first and second multipliers and outputting an imaginary part peak value.

10. The device of claim 9, wherein the certain time is a symbol period.

11. The device of claim 1, wherein the error detecting unit detects the error symbol using a decision region of QPSK modulation.

12. The device of claim 11, wherein the error detecting unit detects the error symbol when a corresponding received symbol used to calculate the real part peak value and the imaginary part peak value lies outside of the decision region.

13. The device of claim 12, wherein a region that lies outside the decision region corresponds to one where $$\tan\left(\frac{r_c(t)}{r_s(t)}\right) > \frac{\pi}{4} \text{ and } \tan\left(\frac{r_c(t)}{r_s(t)}\right) < -\left(\frac{\pi}{4}\right),$$

and wherein $r_c(t)$ indicates the real part peak value and $r_s(t)$ indicates the imaginary part peak value.

14. The device of claim 11, wherein if a ratio of the real part peak value to the imaginary part peak value outputted from the frequency discriminating unit is smaller than −1 or greater than 1, the error detecting unit determines that a symbol used in calculating the real part peak value and the imaginary part peak value is an error symbol, and outputs a control signal for cutting off the real part peak value and the imaginary part peak value to the switching unit.

15. The device of claim 14, wherein if the ratio of the real part peak value to the imaginary part peak value outputted from the frequency discriminating unit is not smaller than −1 but not greater than 1, the error detecting unit determines that a symbol used in calculating the real part peak value and the imaginary part peak value is a normal symbol, and outputs a control signal for passing the real part peak value and the imaginary part peak value to the switching unit.

16. The device of claim 15, wherein the switching unit selectively passes the real part peak value and the imaginary part peak value outputted from the frequency discriminating unit under the control of the error detecting unit.

17. The device of claim 16 wherein the frequency difference average calculating unit adds the real part peak value and the imaginary part peak value that have been passed by the switching unit to a previously real part peak value and a previous imaginary peak value by a vector sum method, respectively, and calculates the real part peak value average and the imaginary part peak value average.

18. The device of claim 1, wherein the received sequence is a received training sequence.

19. An AFC (Automatic Frequency Control) device of a QPSK (Quadrature Phase Shift Keying) modulation system comprising:

calculating first and second peak values based on frequency discrimination between adjacent symbols of a received training sequence;

checking whether a ratio of the first peak value to the second peak value belongs to a region between first and second values;

passing the first and second peak values if the ratio belongs to the region;

calculating a frequency difference of the received training sequence using the passed first and second peak values; and performing automatic frequency control based on the frequency difference.

20. The method of claim 19, wherein the first peak value is calculated based on a difference value between a product of a Q signal of a current symbol and an I signal of a previous symbol and a the product of an I signal of the current symbol and a Q signal of the previous symbol.

21. The method of claim 19, wherein the second peak value is a value obtained by adding a product of an I signal of a current symbol and an I signal of a previous symbol and a the product of a Q signal of the current symbol and a Q signal of the previous symbol.

22. The method of claim 19, wherein the first value indicates −1 and the second value indicates +1.

23. The method of claim 19, wherein calculating the frequency difference comprises:

adding the passed first and second peak values to previous first and second peak values by a vector sum method, respectively, and calculating a first peak value average and a second peak value average; and calculating the frequency difference of the received training sequence based on the first peak value average and the second peak value average.

24. The method of claim 19, further comprising:

calculating a ratio of the first peak value and the second peak value; and if the ratio does not come within the region, the first and second peak values are not passed.

* * * * *